Dec. 8, 1931.  P. F. SHIVERS  1,835,974
SNAP ACTION GAS VALVE
Filed Nov. 1, 1930
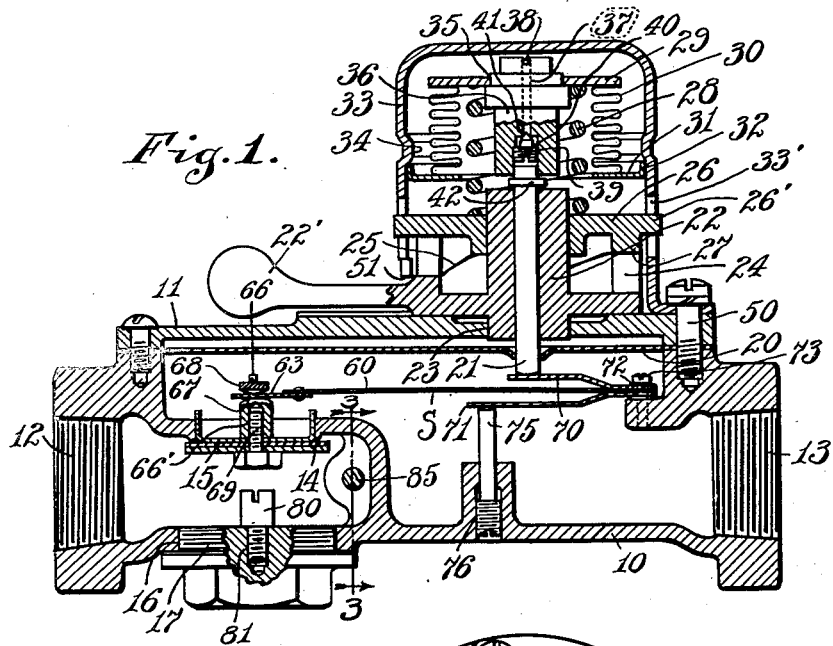
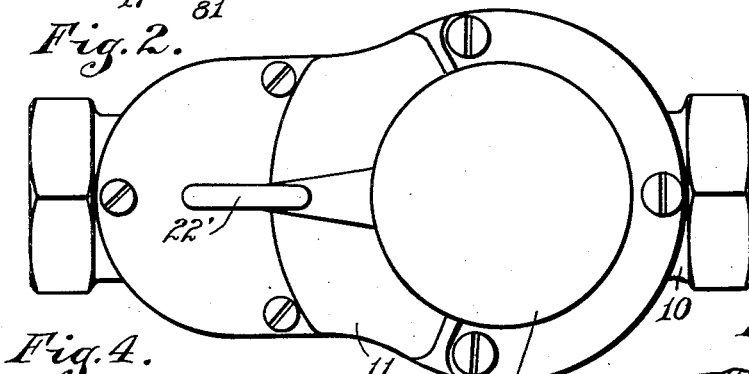
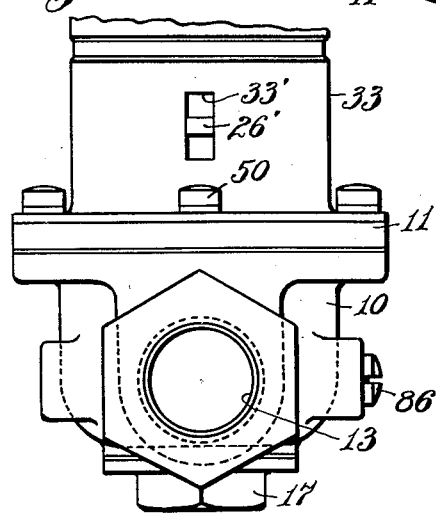
INVENTOR.
Paul F. Shivers,
BY
Hood + Hahn.
ATTORNEYS Patented Dec. 8, 1931

1,835,974

UNITED STATES PATENT OFFICE

PAUL F. SHIVERS, OF WABASH, INDIANA, ASSIGNOR TO MINNEAPOLIS-HONEYWELL REGULATOR COMPANY, OF MINNEAPOLIS, MINNESOTA, A CORPORATION OF DELAWARE

SNAP ACTION GAS VALVE

Application filed November 1, 1930. Serial No. 492,742.

The object of my invention is to produce a temperature-affected mechanism, the end element of which is moved to either of its ultimate limits by a quick snap-action upon response by its temperature-affected element to variations in temperature of the ambient medium thereof to one side or the other of a predetermined neutral temperature.

More specifically, the object of my invention is to produce a flow-controlling valve wherein the movable flow-controlling element will be shifted from one limit of its movement to the other by a snap-action induced by the positioning of an actuator by a temperature-responsive element.

Still more specifically the object of my invention is to produce a temperature-responsive gas valve wherein the flow-controlling element will be snapped to either closed or open position as a result of the positioning of a temperature-responsive element, whereby the supply of a combustible gas to a main burner may be automatically initiated or discontinued as a result of temperature changes in the ambient medium of the temperature-responsive element.

The accompanying drawings illustrate my invention.

Fig. 1 is an axial section;
Fig. 2 is a plan;
Fig. 3 is a section on line 3—3 of Fig. 1;
Fig. 4 is an end elevation; and
Fig. 5 is a perspective of the snap element.

In the drawings 10 indicates the main body of a valve casing having a cover plate 11, an inlet 12, an outlet 13, and an intermediate valve seat 14 with which the movable valve element 15 cooperates.

Opposite seat 14 the casing 10 is perforated at 16 to receive a plug 17.

Interposed between casing body 10 and cover 11 is a gas-tight flexible diaphragm 20 through which is projected a pin 21 slidably mounted in the bore of an adjusting cam 22 journaled at 23 in cover plate 11 and provided with a cam flange 24 having a cam face 25 varying axially of the pin 21.

Slidably mounted on the hub of cam 22 is a spring abutment 26 having a cam flange 27 which meets and rests upon the cam flange 24.

Abutment 26 receives one end of a compression spring 28, the opposite end of which engages the movable head 29 of a bellows 30, the opposite end of which is secured to a. ring 31 flanged at 32 and soldered at an intermediate point in the inverted cup 33. Flange 32 is conveniently positioned against an internal shoulder 34 spun in the wall of cup 33. The head 29 is a disk ring secured to shoulder 35 of a pin 36 which is provided with a bore 37 leading at one end into a cross-slot 38 and at the other end into a threaded enlargement 39 receiving a screw 40 which has a valve tip 41 adapted to close the outer end of bore 37.

The upper end of pin 21 enters the lower end of the enlarged bore 39 and is provided with a circumferential flange 42 which limits downward movement of pin 21 through the hub of element 22 and which is engaged by the lower end of pin 36.

Rotation of cam 26 is prevented by radially-projecting fingers 26' which project into slots 33' formed in the side walls of the cup 33.

The cup 33 is removably held upon cover 11 by some of the screws 50 which serve to retain the cover plate in position. The side wall of cup 33 is provided with a slot 51 through which is projected a finger piece 22' projected from the main body of the cam 22.

The lower end of pin 21 is projected through the diaphragm 20 with a gas-tight union and serves as the actuator or controlling element for the snap-acting element S. This snap-acting element comprises a thin spring metal plate longitudinally slit through the major portion of its length from one end to form two fingers 60, 60, each of which is perforated at 61 near its outer end and the unslit base of which is perforated at 62, 62.

The two ends of the fingers 60 are connected by a bridge piece 63 perforated at 64, 64. The perforations 64, 64 are closer together than perforations 61, 61 so that the parts when assembled by riveting require the fingers 60, 60 to be stressed laterally toward each other, the assembly making this stress permanent and producing a longitudinal bulging or buckling of the plate as a whole to one side or the other of a medial position, the arrangement being such that the bridge piece 63 cannot occupy permanently a position in the plane of the unslitted end of element S.

Bridge piece 63 is perforated at 65 to loosely receive the upper reduced end of a pin 66, the bridge piece lying loosely between the shoulder 67 of said pin and a nut 68 threaded thereon. Pin 66 is provided with a threaded bore 66′ adapted to receive a screw 69 which is passed through valve 15 and into bore 66′.

Secured to the base end of element S, on opposite sides thereof and projecting toward the middle of said plate with their free ends spaced therefrom, are two spring fingers 70 and 71, the parts being conveniently assembled by eyelets 72 passing through the roots of the spring fingers and through perforations 62, 62. The snap element S is loosely anchored within casing 10 by screws 73 which pass loosely through the eyelets. Finger 70 underlies and is engaged by the lower end of pin 21. Finger 71 is somewhat longer than finger 70 and overlies and engages the upper end of a pin 75 projected into the delivery chamber of casing 10. Pin 75, for purposes of ready adjustment longitudinally of pin 21, is projected through the wall of casing 10 and is provided with a threaded mounting 76.

The parts are so proportioned and adjusted that, when fingers 70 and 71 are subjected to less than a predetermined pinching force, fingers 60 will buckle upwardly so that bridge piece 63 will be thrown downwardly and valve 15 will be moved from its seat.

Application of a pinching force upon fingers 70 and 71 greater than a predetermined amount, will cause finger 60 to buckle downwardly, thus throwing bridge piece 63 upwardly so as to move valve 15 upwardly against seat 14.

The snap element S being anchored at 73, displacement of the free end of the finger 71 upwardly tends to buckle fingers 60 upwardly and displacement of the free end of finger 70 downwardly tends to cause fingers 60 to buckle downwardly.

A quantity of expansible-and-contractible or volatile liquid, of a predetermined character and quantity depending upon the thermic conditions under which the device is to operate, is introduced into the cell formed by cup 33 and bellows 30 and sealed by engagement of the inner end of pin 40 with seat 41.

Upon increase of temperature of the ambient medium of the thermostatic cell, pin 21 is driven downwardly against finger 70 which will yield until the buckling force which it applies to the root of fingers 60 is sufficient to overcome the opposing stress from finger 71, whereupon finger 60 will buckle suddenly downwardly so as to swing bridge piece 63 upwardly and shift valve 15 to closed position. Upon decrease of temperature of the ambient medium of the thermostatic cell, pin 21 will recede and, when the buckling stress applied by finger 71 exceeds the opposing buckling stress applied by finger 70, fingers 60 will buckle upwardly so as to move bridge piece 63 downwardly and move valve 15 to the open position determined by the adjustment of a stop pin 80 threaded in a pocket 81 formed in the inner end of plug 17.

The temperature at which pin 21 will be positioned downwardly enough to cause the closing movement of the valve 15 will be dependent upon the resistance of spring 28 and this resistance is determined by adjustment of the cammed flange 24 relative to cammed flange 27, swinging of the finger piece 22′ causing a shifting of the spring abutment 26.

Leading from the inlet chamber of casing 10 is a pilot supply passage 82 having a valve seat 83 at its inner end and threaded in the bore 84 is a needle valve 85 cooperating with said seat. The outer end of bore 84 is enlarged and threaded to receive a plug 86, the arrangement being such that there may be a continuous regulated flow of gas to passage 82 irrespective of the position of valve 15.

I claim as my invention:

1. A snap-action element comprising a resilient blade slit at one end with its fingers distorted toward each other and connected by a bridge piece.

2. A snap-action element comprising a resilient blade slit at one end with its fingers distorted toward each other and connected by a bridge piece, and two spring fingers anchored upon the unslit end of said blade upon opposite sides of the blade and overlying the slit portion of the blade and spaced therefrom, one of said fingers being longer than the other.

3. A snap-action element comprising a resilient blade slit at one end with its fingers distorted toward each other and connected by a bridge piece, and two spring fingers anchored upon the unslit end of said blade upon opposite sides of the blade and overlying the slit portion of the blade and spaced therefrom.

4. A snap-action structure embodying a snap-action resilient blade slit from one end with the fingers thereof distorted toward each other and connected by a bridge piece, two spring fingers anchored to the unslit portion of the blade with their free ends spaced from and overlying the slit portion of the blade, one of the fingers being longer than the other, an anchorage for the unslit portion of the blade, an abutment arranged to resist buckling motion of the blade in one direction by engagement with one of the spring fingers, and an actuator movable toward and from the plane of the blade to act upon the blade through the other spring finger in a direction opposed to said abutment.

5. A snap-action structure embodying a snap-action resilient blade slit from one end with the fingers thereof distorted toward each other and connected by a bridge piece, two spring fingers anchored to the unslit portion of the blade with their free ends spaced from and overlying the slit portion of the blade, an anchorage for the unslit portion of the blade, an abutment arranged to resist buckling motion of the blade in one direction by engagement with one of the spring fingers, and an actuator movable toward and from the plane of the blade to act upon the blade through the other spring finger in a direction opposed to said abutment.

6. A snap-action structure embodying a snap-action resilient blade slit from one end with the fingers thereof distorted toward each other and connected by a bridge piece, an anchorage for the unslit portion of the blade, an abutment arranged to resist buckling motion of the blade in one direction and an actuator movable toward and from the plane of the blade to act upon the blade in a direction opposed to said abutment.

7. A snap-action valve comprising a valve casing having an intermediate valve seat, a valve movable toward and from said seat, a snap-action blade comprising two fingers which, at one end of the blade are distorted toward each other and connected by a bridge piece, a connection between said bridge piece and the moveable valve, two spring fingers anchored upon the blade at the end opposite the bridge piece with their free ends overlying the fingers and spaced therefrom, one finger being longer than the other, an anchorage for the end of the blade opposite the bridge piece permitting opposite buckling of the blade, an abutment arranged to resist buckling movement of the blade in one direction by engagement with one of said spring fingers, and an actuator movable toward and from the plane of the blade and arranged to act upon the blade through the other spring finger in opposition to the abutment.

8. A snap-action valve comprising a valve casing having an intermediate valve seat, a valve movable toward and from said seat, a snap action blade comprising two fingers which, at one end of the blade are distorted toward each other and connected by a bridge piece, a connection between said bridge piece and the movable valve, two spring fingers anchored upon the blade at the end opposite the bridge piece with their free ends overlying the fingers and spaced therefrom, an anchorage for the end of the blade opposite the bridge piece permitting opposite buckling of the blade, an abutment arranged to resist buckling movement of the blade in one direction by engagement with one of said spring fingers, and an actuator movable toward and from the plane of the blade and arranged to act upon the blade through the other spring finger in opposition to the abutment.

9. A snap-action valve comprising a valve casing having an intermediate valve seat, a valve movable toward and from said seat, a snap-action blade comprising two fingers which, at one end of the blade are distorted toward each other and connected by a bridge piece, a connection between said bridge piece and the movable valve, an anchorage for the end of the blade opposite the bridge piece permitting opposite buckling of the blade, an abutment arranged to resist buckling movement of the blade in one direction, and an actuator movable toward and from the plane of the blade and arranged to act upon the blade in opposition to the abutment.

In witness whereof, I, PAUL F. SHIVERS, have hereunto set my hand at Wabash, Indiana, this 10 day of October, A. D. one thousand nine hundred and thirty.

PAUL F. SHIVERS.